(12) United States Patent
Moreton et al.

(10) Patent No.: US 10,160,850 B2
(45) Date of Patent: *Dec. 25, 2018

(54) QUATERNARY AMMONIUM SALT OF A POLYALKENE-SUBSTITUTED AMINE COMPOUND

(71) Applicant: The Lubrizol Corporation, Wickliffe, OH (US)

(72) Inventors: David J. Moreton, Milford (GB); Paul R. Stevenson, Belper (GB); Dean Thetford, Norden (GB); Jonathan S. Vilardo, Chardon, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/547,409

(22) Filed: Nov. 19, 2014

(65) Prior Publication Data

US 2015/0072910 A1    Mar. 12, 2015

Related U.S. Application Data

(63) Continuation of application No. 11/557,986, filed on Nov. 9, 2006, now abandoned.

(51) Int. Cl.
| | |
|---|---|
| *C08L 23/36* | (2006.01) |
| *C10M 159/12* | (2006.01) |
| *C10L 1/2383* | (2006.01) |
| *C10L 1/222* | (2006.01) |
| *C10L 10/04* | (2006.01) |
| *C10L 10/08* | (2006.01) |
| *C10L 1/30* | (2006.01) |
| *C09D 11/03* | (2014.01) |
| *C10M 133/54* | (2006.01) |
| *C10L 10/18* | (2006.01) |
| *C09D 5/00* | (2006.01) |
| *C09D 7/45* | (2018.01) |

(52) U.S. Cl.
CPC ............... *C08L 23/36* (2013.01); *C09D 5/00* (2013.01); *C09D 7/45* (2018.01); *C09D 11/03* (2013.01); *C10L 1/2222* (2013.01); *C10L 1/2383* (2013.01); *C10L 1/305* (2013.01); *C10L 10/04* (2013.01); *C10L 10/08* (2013.01); *C10L 10/18* (2013.01); *C10M 133/54* (2013.01); *C10M 159/12* (2013.01); *C10L 2200/029* (2013.01); *C10L 2200/0213* (2013.01); *C10L 2200/0259* (2013.01); *C10L 2200/0268* (2013.01); *C10L 2230/081* (2013.01); *C10L 2270/023* (2013.01); *C10L 2270/026* (2013.01); *C10M 2223/045* (2013.01); *C10N 2210/02* (2013.01); *C10N 2220/021* (2013.01); *C10N 2230/02* (2013.01); *C10N 2230/70* (2013.01); *C10N 2240/10* (2013.01); *C10N 2270/00* (2013.01)

(58) Field of Classification Search
CPC ... C08L 23/36; C10M 133/04; C10M 133/06; C10M 133/12; C10M 133/54; C10M 159/12; C10M 2223/045; C10N 2210/02; C10N 2220/021; C10N 2230/02; C10N 2230/70; C10N 2240/10; C10N 2270/00; C10L 1/305; C10L 1/2222; C10L 1/2383; C10L 10/04; C10L 10/08; C10L 10/18; C10L 2200/029; C10L 2200/0268; C10L 2200/0213; C10L 2200/0259; C10L 2230/081; C09D 5/00; C09D 7/45; C09D 11/03
USPC ........................................................ 508/389
See application file for complete search history.

(56) References Cited

U.S. PATENT DOCUMENTS

| | | | |
|---|---|---|---|
| 3,401,119 A | | 9/1968 | Froehlich et al. |
| 3,468,816 A | | 9/1969 | Thompson et al. |
| 3,778,371 A | | 12/1973 | Malec et al. |
| 4,056,531 A | * | 11/1977 | Malec ............... C07D 213/20 |
| | | | 544/107 |
| 4,108,858 A | | 8/1978 | Malec et al. |
| 4,171,959 A | * | 10/1979 | Vartanian ............. C10L 1/2437 |
| | | | 44/333 |
| 4,253,980 A | | 3/1981 | Hammond et al. |
| 4,272,395 A | | 6/1981 | Wright |
| 4,306,070 A | | 12/1981 | Hammond et al. |
| 4,326,973 A | | 4/1982 | Hammond et al. |
| 4,338,206 A | | 7/1982 | Hammond et al. |
| 5,000,792 A | | 3/1991 | Hiroshi et al. |
| 5,254,138 A | | 10/1993 | Kurek et al. |

(Continued)

FOREIGN PATENT DOCUMENTS

| | | |
|---|---|---|
| EP | 0008839 | 9/1978 |
| EP | 0247832 | 12/1987 |
| EP | 0293192 | 11/1988 |
| EP | 0684223 | 11/1995 |

(Continued)

OTHER PUBLICATIONS

Von H. Rutzen, Quaternierung von tertiaren Aminsalzen mit langkettigen Epoxiden, 1982, pp. 87-92, Art. 84 EPC.

European Patent Office, Interlocutory Decision in Opposition Proceedings for European Application No. 07863924.2, dated Apr. 20, 2016.

*Primary Examiner* — James C Goloboy

(74) *Attorney, Agent, or Firm* — Iken Sans; Christopher Demas

(57) ABSTRACT

A quaternary ammonium salt detergent made from the reaction product of the reaction of: (a) polyalkene-substituted amine having at least one tertiary amino group; and (b) a quaternizing agent suitable for converting the tertiary amino group to a quaternary nitrogen and the use of such quaternary ammonium salt detergents in a fuel composition to reduce intake valve deposits.

14 Claims, No Drawings

(56) References Cited

U.S. PATENT DOCUMENTS

| | | | |
|---|---|---|---|
| 5,721,358 A | 2/1998 | Hikosaka et al. | |
| 7,906,470 B2 * | 3/2011 | Stevenson | C09D 7/02 |
| | | | 44/415 |
| 8,083,814 B2 * | 12/2011 | Stevenson | C09D 7/02 |
| | | | 106/31.43 |
| 2003/0213410 A1 | 11/2003 | Adams et al. | |
| 2008/0052985 A1 * | 3/2008 | Stevenson | C09D 7/02 |
| | | | 44/415 |

FOREIGN PATENT DOCUMENTS

| | | |
|---|---|---|
| EP | 0832964 | 4/1998 |
| GB | 1373660 | 11/1974 |

* cited by examiner

QUATERNARY AMMONIUM SALT OF A POLYALKENE-SUBSTITUTED AMINE COMPOUND

BACKGROUND OF THE INVENTION

The composition of the present invention relates to a quaternary ammonium salt detergent and the use of such quaternary ammonium salt detergents in a fuel composition to reduce intake valve deposits and remove or clean up existing deposits on the intake valves; and the use of the quaternary ammonium salt in media such as inks, coatings, mill-bases, plastics and paints.

It is well known that liquid fuel contains components that can degrade during engine operation and form deposits. These deposits can lead to incomplete combustion of the fuel resulting in higher emission and poorer fuel economy. Fuel additives, such as detergents, are well known additives in liquid fuels to help with control or minimize deposit formation. As the dynamics and mechanics of an engine continual advance, the requirements of the fuel must evolve to keep up with these engine advancements. For example, today's engines have injector system that have smaller tolerances and operate at higher pressure to enhance fuel spray to the compression or combustion chamber. Deposit prevention and deposit reduction in these new engines has become critical to optimal operation of today's engines. Advancements in fuel additive technology, such as detergents, have enabled the fuel to keep up with these engine advancements. Therefore, there is a need for detergent capable of providing acceptable performance in a liquid fuel to promote optimal operation of today's engines.

U.S. Pat. No. 5,000,792 discloses polyesteramine detergent obtainable by reacting 2 parts of polyhydroxycarboxylic acids with 1 part of dialkylenetriamine.

U.S. Pat. No. 4,171,959 discloses a motor fuel composition containing quaternary ammonium salts of a succinimide. The quaternary ammonium salt has a counterion of a halide, a sulphonate or a carboxylate.

U.S. Pat. No. 4,338,206 and U.S. Pat. No. 4,326,973 discloses fuel compositions containing a quaternary ammonium salt of a succinimide, wherein the ammonium ion is heterocyclic aromatic (pyridinium ion).

U.S. Pat. No. 4,108,858 discloses a fuel or lubricating oil composition containing a C2 to C4 polyolefin with a Mw of 800 to 1400 salted with a pyridinium salt.

U.S. Pat. No. 5,254,138 discloses a fuel composition containing a reaction product of a polyalkyl succinic anhydride with a polyamino hydroxyalkyl quaternary ammonium salt.

U.S. Pat. No. 4,056,531 discloses a lubricating oil or fuel containing a quaternary ammonium salt of a hydrocarbon with a Mw of 350 to 3000 bonded to triethylenediamine. The quaternary ammonium salt counterion is selected from halides, phosphates, alkylphosphates, dialkylphosphates, borates, alkylborates, nitrites, nitrates, carbonates, bicarbonates, alkanoates, and O,O-dialkyldithiophosphates.

U.S. Pat. No. 4,253,980 and U.S. Pat. No. 4,306,070 disclose a fuel composition containing a quaternary ammonium salt of an ester-lactone.

U.S. Pat. No. 3,778,371 discloses a lubricating oil or fuel containing a quaternary ammonium salt of a hydrocarbon with a Mw of 350 to 3000; and the remaining groups to the quaternary nitrogen are selected from the group of C1 to C20 alkyl, C2 to C8 hydroxyalkyl, C2 to C20 alkenyl or cyclic groups.

The present invention, therefore, promotes optimal engine operation, that is, increased fuel economy, better vehicle drivability, reduced emissions and less engine maintenance by reducing, minimizing and controlling deposit formation.

Many formulations such as inks, paints, mill-bases and plastics materials require effective dispersants for uniformly distributing a particulate solid in an organic medium. The organic medium may vary from a polar to non-polar organic medium. Dispersants containing terminal basic groups such as poly(lower alkylene)imine chains are well known and are generally prepared by reaction of the polyimine with polyester chains containing terminal acid groups, the reaction results in a mixture of amide and salt forms. However, many of these dispersants have limited performance towards viscosity and stability properties, which when incorporated into printing inks or paints give the inks and paints with poor flow characteristics. Therefore, there is a need for a dispersant capable of providing acceptable flow characteristics and having stability properties.

U.S. Pat. No. 5,721,358 which discloses a process for copper phthalocyanine production using a dispersant derived from a non-salted succinimide dispersant. The succinimide dispersant is derived from an alkyleneamine and polyisobutylene succinic anhydride.

US Application 2003/0213410 discloses a polymer-modified pigment comprising a polymer with at least one carboxylic group or salt thereof and at least one coupling agent. The polymer includes derivatives of polyamines that have been reacted with an acylating agent such as acetic or succinic anhydride.

GB 1,373,660 discloses polyesteramine dispersants obtainable by reaction of polyhydroxycarboxylic acids with diamines especially alkylenediamines and their salts thereof.

Therefore, it would be advantageous to have a dispersant with acceptable performance, which when incorporated into inks, coatings, mill-bases, plastics and paints gives the inks, coatings, mill-bases, plastics or paints acceptable flow characteristics.

SUMMARY OF THE INVENTION

For the purposes of this application, the reaction product disclosed herein may be described as either a detergent or dispersant depending on the field of use. For example, in the field of fuel and/or lubricant additives the term detergent may mean an additive that has the ability to keep engine parts clean, while in the field of inks, coatings, mill-bases, plastics and paints the term dispersant may mean an additive for uniformly distributing a particulate solid in an organic medium.

The present invention provides a composition comprising a quaternary ammonium salt which comprises the reaction product of:
a. polyalkene-substituted amine having at least one tertiary amino group; and
b. quaternizing agent suitable for converting the tertiary amino group to a quaternary nitrogen.

The present invention further provides a method for fueling an internal combustion engine, comprising:
A. supplying to said engine:
i. a fuel which is liquid at room temperature; and
ii. quaternary ammonium salt comprising the reaction product of:
a. polyalkene-substituted amine having at least one tertiary amino group; and
b. a quaternizing agent suitable for converting the tertiary amino group to a quaternary nitrogen.

The present invention additionally provides a method of lubricating an internal combustion engine comprising:

A. supplying to the crankcase of said engine:
   i. an oil of lubricating viscosity; and
   ii. quaternary ammonium salt comprising the reaction product of:
      a. polyalkene-substituted amine having at least one tertiary amino group; and
      b. a quaternizing agent suitable for converting the tertiary amino group to a quaternary nitrogen.

The present invention further provides a composition comprising: (i) a particulate solid; (ii) an organic medium; and (iii) a quaternary ammonium salt which comprises the reaction product of:
   a. polyalkene-substituted amine having at least one tertiary amino group; and
   b. quaternizing agent suitable for converting the tertiary amino group to a quaternary nitrogen.

The present invention further provides a paint or ink composition comprising a particulate solid, an organic liquid, a binder and a quaternary ammonium salt which comprises the reaction product of:
   a. polyalkene-substituted amine having at least one tertiary amino group; and
   b. quaternizing agent suitable for converting the tertiary amino group to a quaternary nitrogen.

The present invention further provides a mill-base comprising a particulate solid, an organic liquid and a quaternary ammonium salt which comprises the reaction product of:
   a. polyalkene-substituted amine having at least one tertiary amino group; and
   b. quaternizing agent suitable for converting the tertiary amino group to a quaternary nitrogen.

DETAILED DESCRIPTION OF THE INVENTION

Various preferred features and embodiments will be described below by way of non-limiting illustration.

Field of the Invention

This invention involves a quaternary ammonium salt, a fuel composition that includes the quaternary ammonium salt, and a method of operating an internal combustion engine with the fuel composition. The compositions and methods of the present invention minimize, reduce and control deposit formation in the engine, which reduces fuel consumption, promotes drivability, vehicle maintenance, and reduces emissions which enables optimal engine operation.

Fuel

The composition of the present invention can comprise a fuel which is liquid at room temperature and is useful in fueling an engine. The fuel is normally a liquid at ambient conditions e.g., room temperature (20 to 30° C.). The fuel can be a hydrocarbon fuel, a nonhydrocarbon fuel, or a mixture thereof. The hydrocarbon fuel can be a petroleum distillate to include a gasoline as defined by ASTM specification D4814 or a diesel fuel as defined by ASTM specification D975. In an embodiment of the invention the fuel is a gasoline, and in other embodiments the fuel is a leaded gasoline, or a nonleaded gasoline. In another embodiment of this invention the fuel is a diesel fuel. The hydrocarbon fuel can be a hydrocarbon prepared by a gas to liquid process to include for example hydrocarbons prepared by a process such as the Fischer-Tropsch process. The nonhydrocarbon fuel can be an oxygen containing composition, often referred to as an oxygenate, to include an alcohol, an ether, a ketone, an ester of a carboxylic acid, a nitroalkane, or a mixture thereof. The nonhydrocarbon fuel can include, for example, methanol, ethanol, methyl t-butyl ether, methyl ethyl ketone, transesterified oils and/or fats from plants and animals such as rapeseed methyl ester and soybean methyl ester, and nitromethane. In several embodiments of this invention the fuel can have an oxygenate content on a weight basis that is 1 percent by weight, or 10 percent by weight, or 50 percent by weight, or up to 85 percent by weight. Mixtures of hydrocarbon and nonhydrocarbon fuels can include, for example, gasoline and methanol and/or ethanol, diesel fuel and ethanol, and diesel fuel and a transesterified plant oil such as rapeseed methyl ester. In an embodiment of the invention, the liquid fuel can be an emulsion of water in a hydrocarbon fuel, a nonhydrocarbon fuel, or a mixture thereof. In several embodiments of this invention the fuel can have a sulfur content on a weight basis that is 5000 ppm or less, 1000 ppm or less, 300 ppm or less, 200 ppm or less, 30 ppm or less, or ppm or less. In another embodiment, the fuel can have a sulfur content on a weight basis of 1 to 100 ppm. In one embodiment, the fuel contains 0 ppm to 1000 ppm, or 0 to 500 ppm, or 0 to 100 ppm, or 0 to 50 ppm, or 0 to 25 ppm, or 0 to 10 ppm, or 0 to 5 ppm of alkali metals, alkaline earth metals, transition metals or mixtures thereof. In another embodiment, the fuel contains 1 to 10 ppm by weight of alkali metals, alkaline earth metals, transition metals or mixtures thereof. It is well known in the art that a fuel containing alkali metals, alkaline earth metals, transition metals or mixtures thereof have a greater tendency to form deposits and therefore foul or plug injectors. The fuel of the invention can be present in a fuel composition in a major amount that is generally greater than 50 percent by weight, and in other embodiments is present at greater than 90 percent by weight, greater than 95 percent by weight, greater than 99.5 percent by weight, or greater than 99.8 percent by weight.

Quaternary Ammonium Salt

The composition of the present invention comprises an quaternary ammonium salt which comprises the reaction product of: (a) polyalkene-substituted amine having at least one tertiary amino group; (b) a quaternizing agent suitable for converting the tertiary amino group to a quaternary nitrogen wherein the quaternizing agent is selected from the group consisting of dialkyl sulfates, alkyl halides, hydrocarbyl substituted carbonates; hydrocarbyl epoxides in combination with an acid or mixtures thereof.

Examples of quaternary ammonium salt and methods for preparing the same are described in the following patents, which are hereby incorporated by reference, U.S. Pat. Nos. 4,253,980; 3,778,371; 4,171,959; 4,326,973; 4,338,206; and 5,254,138.

Polyalkene-Substituted Amine

The polyalkene-substituted amines having at least one tertiary amino group of the present invention may be derived from an olefin polymer and an amine, such as, ammonia, monoamines, polyamines or mixtures thereof. They may be prepared by a variety of methods such as those described hereinafter.

One method of preparation of a polyalkene-substituted amine involves reacting a halogenated olefin polymer with an amine, as disclosed in U.S. Pat. Nos. 3,275,554; 3,438,757; 3,454,555; 3,565,804; 3,755,433; and 3,822,289.

Another method of preparation of a polyalkene-substituted amine involves reaction of a hydroformylated olefin with a polyamine and hydrogenating the reaction product, as disclosed in U.S. Pat. Nos. 5,567,845 and 5,496,383.

Another method of preparation of a polyalkene-substituted amine involves converting a polyalkene by means of a conventional epoxidation reagent with or without a catalyst, into the corresponding epoxide and converting the epoxide into the polyalkene substituted amine by reaction with ammonia or an amine under the conditions of reductive amination, as disclosed in U.S. Pat. No. 5,350,429.

Another method for preparing polyalkene-substituted amine involves hydrogenation of a β-aminonitrile, which is made by reacting an amine with a nitrile, as disclosed in U.S. Pat. No. 5,492,641.

Yet another method for preparing polyalkene-substituted amine involves hydroformylating an polybutene or polyisobutylene with a catalyst, such as, rhodium or cobalt, in the presence of CO and H2 at elevated pressures and temperatures, as disclosed in U.S. Pat. No. 4,832,702.

The above methods for the preparation of polyalkene substituted amine are for illustrative purposes only and are not meant to be an exhaustive list. The polyalkene-substituted amines of the present invention are not limited in scope to the methods of their preparation disclosed hereinabove.

In one embodiment, the olefin polymers used to make the polyalkene-substituted amine of the present invention are derived from olefin polymers. The olefin polymers can include homopolymers and interpolymers of polymerizable olefin monomers of 2 to about 16 carbon atoms, and in another embodiment from 2 to about 6 carbon atoms, and in yet another embodiment from 2 to about 4 carbon atoms. The interpolymers are those in which two or more olefin monomers are interpolymerized according to well known conventional procedures to form polyalkenes having units within their structure derived from each of said two or more olefin monomers. Thus "interpolymer(s)" as used herein is inclusive of copolymers, terpolymers, and tetrapolymers. As will be apparent to those of ordinary skill in the art, the polyalkenes from which the polyalkene-substituted amines (a) are derived are often conventionally referred to as "polyolefin(s)".

The olefin monomers from which the olefin polymers are derived include polymerizable olefin monomers characterized by the presence of one or more ethylenically unsaturated groups (i.e., >C=C<); that is, they are monoolefinic monomers such as ethylene, propylene, 1-butene, isobutene (2-methyl-1-butene), 1-octene or polyolefinic monomers (usually diolefinic monomers), such as, 1,3-butadiene and isoprene.

The olefin monomers are usually polymerizable terminal olefins; that is, olefins characterized by the presence in their structure of the group >C=CH$_2$. However, polymerizable internal olefin monomers characterized by the presence within their structure of the group

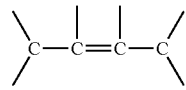

can also be used to form the polyalkenes.

Specific examples of terminal and internal olefin monomers, which can be used to prepare the polyalkenes according to conventional, well-known polymerization techniques include: ethylene; propylene; the butenes (butylenes), including 1-butene, 2-butene and isobutylene; 1-pentene; 1-hexene; 1-heptene; 1-octene; 1-nonene; 1-decene; 2-pentene; propylene-tetramer; diisobutylene; isobutylene trimer; 1,2-butadiene; 1,3-butadiene; 1,2-pentadiene; 1,3-pentadiene; 1,4-pentadiene; isoprene; 1,5-hexadiene; 2-methyl-5-propyl-1-hexene; 3-pentene; 4-octene; and 3,3-dimethyl-1-pentene.

In one embodiment, the olefin polymer is obtained by polymerization of a C$_4$ refinery stream having a butene content of about 35 to about 75 weight percent and isobutene content of about 30 to about 60 weight percent, in the presence of a Lewis acid catalyst such as aluminum trichloride or boron trifluoride. These polybutenes typically contain predominantly (greater than about 80% of total repeating units) isobutylene repeating units of the configuration

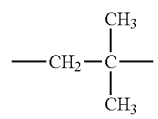

In another embodiment, the polyalkene substituent of the polyalkene-substituted amine is derived from a polyisobutylene.

In one embodiment, the amines that can be used to make the polyalkene-substituted amine include ammonia, monoamines, polyamines, or mixtures thereof, including mixtures of different monoamines, mixtures of different polyamines, and mixtures of monomamines and polyamines (which include diamines). The amines include aliphatic, aromatic, heterocyclic and carbocyclic amines.

The monoamines and polyamines are characterized by the presence within their structure of at least one H—N< group. Therefore, they have at least one primary (e.g., H$_2$N—) or secondary amine (e.g., 1 H—N<) group. The amines can be aliphatic, cycloaliphatic, aromatic or heterocyclic.

The monoamines are generally substituted with a hydrocarbyl group having 1 to about 50 carbon atoms. These hydrocarbyl groups can be aliphatic and free from acetylenic unsaturation and contain 1 to about 30 carbon atoms. Saturated aliphatic hydrocarbon radicals containing 1 to about 30 carbon atoms are particularly preferred.

In one embodiment, the monoamines can be represented by the formula HNR$^1$R$^2$ wherein R$^1$ is a hydrocarbyl group of up to about 30 carbon atoms and R$^2$ is hydrogen or a hydrocarbyl group of up to about 30 carbon atoms. Examples of suitable monoamines include methylamine, ethylamine, diethylamine, 2-ethylhexylamine, di-(2-ethylhexyl)amine, n-butylamine, di-n-butylamine, allylamine, isobutylamine, cocoamine, stearylamine, laurylamine, methyllaurylamine, and oleylamine.

Aromatic monoamines include those monoamines wherein a carbon atom of the aromatic ring structure is attached directly to the amine nitrogen. The aromatic ring will usually be a mononuclear aromatic ring (i.e., one derived from benzene) but can include fused aromatic rings, especially those derived from naphthalene. Examples of aromatic monoamines include: aniline, di(para-methylphenyl)amine, naphthylamine, and N-(n-butyl)aniline. Examples of aliphatic substituted, cycloaliphatic-substituted, and heterocyclic-substituted aromatic monoamines include: para-dodecylaniline, cyclohexyl-substituted naphthylamine, and thienyl-substituted aniline respectively.

Hydroxy amines are also included in the class of useful monoamines. Such compounds are the hydroxyhydrocarbyl-substituted analogs of the aforementioned monoamines. In one embodiment, the hydroxy monoamines can be represented by the formula HNR$^3$R$^4$, wherein R$^3$ is a hydroxy-substituted alkyl radical of up to about 30 carbon atoms, and in one embodiment up to about 10 carbon atoms, and $R^4$ is a hydroxysubstituted alkyl radical of up to about 30 carbon atoms, hydrogen, or a hydrocarbyl group of up to about 10 carbon atoms. Examples of hydroxy-substituted monoamines include: ethanolamine, di-3-propanolamine, 4-hydroxybutylamine, diethanolamine, and N-methyl-2-hydroxypropylamine.

In another embodiment, the amine of the polyalkene-substituted amine can be a polyamine. The polyamine may be aliphatic, cycloaliphatic, heterocyclic or aromatic. Examples of the polyamines include: alkylene polyamines, hydroxy containing polyamines, arylpolyamines, and heterocyclic polyamines.

The alkylene polyamines include those represented by the formula

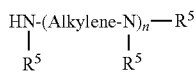

wherein n ranges from 1 to about 10, and in one embodiment from 2 to about 7, and in one embodiment from 2 to about 5, and the "Alkylene" group has from 1 to about 10 carbon atoms, and in one embodiment from 2 to about 6, and in one embodiment from 2 to about 4 carbon atoms. $R^5$ is independently hydrogen, aliphatic, hydroxy- or amine-substituted aliphatic group of up to about 30 carbon atoms. Typically $R^5$ is H or lower alkyl (an alkyl group of 1 to about 5 carbon atoms), most typically, H. Such alkylene polyamines include: methylene polyamine, ethylene polyamines, butylene polyamines, propylene polyamines, pentylene polyamines, hexylene polyamines and heptylene polyamines. The higher homologs of such amines and related aminoalkyl-substituted piperazines are also included.

Specific alkylene polyamines useful in preparing the polyalkene-substituted amines of this invention include: ethylene diamine, diethylene triamine, triethylene tetramine, tetraethylene pentamine, propylene diamine, 3-dimethylaminopropylamine, trimethylene diamine, hexamethylene diamine, decamethylene diamine, octamethylene diamine, di(heptamethylene)triamine, tripropylene tetramine, pentaethylene hexamine, di(trimethylene triamine), N-(2-amino ethyl)piperazine, and 1,4-bis(2-aminoethyl)piperazine.

Ethylene polyamines, such as those mentioned above, are especially useful for reasons of cost and effectiveness. Such polyamines are described in detail under the heading "Diamines and Higher Amines" in the Encyclopedia of Chemical Technology, Second Edition, Kirk and Othemer, Volume 7, pages 27-39, Interscience Publishers, Division of John Wiley and Sons, 1965. Such compounds are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines.

Other useful types of polyamine mixtures are those resulting from stripping of the above-described polyamine mixtures to leave as residue what is often termed "polyamine bottoms". In general, alkylenepolyamine bottoms can be characterized as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products, such as, piperazine and higher analogs of diethylenetriamine, triethylenetetriamine and the like.

The hydroxy containing polyamines can include: hydroxyalkyl alkylene polyamines having one or more hydroxyalkyl substituents on the nitrogen atoms. Such polyamines may be made by reacting the above-described alkylenepolyamines with one or more of alkylene oxides (e.g., ethylene oxide, propylene oxide, and butylene oxide). Similar alkylene oxide-alkanolamine reaction products may also be used such as the products made by reacting primary, secondary or tertiary alkanolamines with ethylene, propylene or higher epoxides in a 1:1 to 1:2 molar ratio. Reactant ratios and temperatures for carrying out such reactions are known to those skilled in the art.

In one embodiment, hydroxyalkyl-substituted alkylene polyamines can be those in which the hydroxyalkyl group is a lower hydroxyalkyl group, i.e., having less than eight carbon atoms. Examples of such hydroxyalkyl-substituted polyamines include: N-(2-hydroxyethyl)ethylene diamine (also known as 2-(2-Aminoethylamino)ethanol), N,N-bis(2-hydroxyethyl)ethylene diamine, 1-(2-hydroxyethyl)piperazine, mono hydroxypropyl-substituted diethylene triamine, dihydroxypropyl-substituted tetraethylene pentamine, and N-(3-hydroxybutyl)tetramethylene diamine.

The arylpolyamines are analogous to the aromatic monoamines mentioned above except for the presence within their structure of another amino nitrogen. Some examples of arylpolyamines include: N,N'-di-n-butyl-para-phenylene diamine and bis-(para-aminophenyl)methane.

The heterocyclic mono- and polyamines can include: aziridines, azetidines, azolidines, pyridines, pyrroles, indoles, piperidines, imidazoles, piperazines, isoindoles, purines, morpholines, thiomorpholines, N-aminoalkylmorpholines, N-aminoalkylthiomorpholines, N-aminoalkylpiperazines, N,N'-diamino-alkylpiperazines, azepines, azocines, azonines, azecines and tetra-, di- and perhydro derivatives of each of the above and mixtures of two or more of these heterocyclic amines. Typical heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include: N-aminopropylmorpholine, N-amino ethylpiperazine, and N,N'-diaminoethylpiperazine. Hydroxy heterocyclic polyamines are also useful, examples include: N-(2-hydroxyethyl)cyclohexylamine, 3-hydroxycyclopentylamine, parahydroxy-aniline, and N-hydroxyethylpiperazine.

Examples of polyalkene-substituted amines can include: poly(propylene)amine, poly(butene)amine, N,N-dimethyl-polyisobutyleneamine; N-polybutenemorpholine, N-poly(butene)ethylenediamine, N-poly(propylene)trimethylenediamine, N-poly(butene)diethylenetriamine, N',N'-poly(butene)tetraethylenepentamine, and N,N-dimethyl-N' poly(propylene)-1,3-propylenediamine.

The number average molecular weight of the polyalkene-substituted amines can range from about 500 to about 5000, or from about 500 to about 3000, and in one embodiment from about 1000 to about 1500.

Any of the above polyalkene-substituted amines, which are secondary or primary amines, may be alkylated to tertiary amines using alkylating agents, also described herein below as quaternizing agents, such as, dialkyl sulfates; alkyl halides; hydrocarbyl substituted carbonates; hydrocarbyl epoxides in combination with an acid and mixtures thereof. When using certain quaternizing agents, such as, alkyl halides or dialkyl sulfates, it may be necessary to provide of a base or basic agent like sodium carbonate or sodium hydroxide to free the amine from its protonated salt after alkylation to give the free tertiary amine. Primary amines require two equivalents of alkylating agent and two equivalents of base to get to a tertiary amine. In one embodiment, the alkylation of a primary amine may often be done in four successive steps, first a treatment with the alkylating agent and then second treatment with a base and then repeating both steps. In another embodiment, it the alkylation of a primary amine can be done in one step, for example, using two moles of alkyl halide in the presences of an excess of heterogeneous base, such as, sodium carbonate. Exhaustive alkylation of a polyamine can be done in a similar manner using an amount of alkylating agent equal to or in excess of the equivalents of hydrogens on the nitrogens of the amine and an excess of base. In one embodiment, the polyamine is partially alkylated to a tertiary amine prior to quaternization.

In another embodiment, alkylating primary amines and secondary amines to tertiary amines may also be accomplished using epoxides. Unlike with the alkyl halides, when using an epoxide, no treatment with base is required to get to the free amine. Typically, when alkylating amines using epoxides, one would use at least one mole of epoxide for each hydrogen atom on the amine (e.g., a simple primary amine, such as, R—NH2, would require two moles of epoxide.) In alkylating to the tertiary amine with an epoxide, neither additional acid nor base is required.

Quaternizing Agent

The composition of the present invention contains a quaternizing agent suitable for converting the tertiary amino group to a quaternary nitrogen wherein the quaternizing agent is selected from the group consisting of dialkyl sulfates, alkyl halides, hydrocarbyl substituted carbonates; hydrocarbyl epoxides in combination with an acid and mixtures thereof. When the polyalkene-substituted amine contains solely primary or secondary amino groups, it is necessary to alkylate at least one of the primary or secondary amino groups to a tertiary amino group as described above.

In one embodiment, alkylation of primary amines and secondary amines or mixtures with tertiary amines may be exhaustively or partially alkylated to a tertiary amine and further alkylated to a quaternary salt all in one step. In this one step, it is necessary to properly account for the hydrogens on the nitrogens and provide base or acid as required (e.g., alkylation up to the tertiary amine requires removal (neutralization) of the hydrogen (proton) from the product of the alkylation). With alkylating agents, such as, alkyl halides or dialkyl sulfates, the product of alkylation of a primary or secondary amine is a protonated salt and needs a source of base to free the amine and to proceed to the quaternary salt with these such agents requires alkylation of the tertiary amine, and the product is the quaternary ammonium halide or monomethyl sulfate. In contrast, epoxides as alkylating agents do both the alkylation and the neutralization such that the intermediate alkylation product is already the free amine. To proceed to the quaternary salt with epoxides it is necessary to provide an equivalent of an acid to provide a proton for the hydroxy group and a counter anion for the salt.

In one embodiment, the quaternizing agent can include: halides, such as chloride, iodide or bromide; hydroxides; sulphonates; alkyl sulphates, such as, dimethyl sulfate; sultones; phosphates; $C_{1-12}$ alkylphosphates; di $C_{1-12}$ alkylphosphates; borates; $C_{1-12}$ alkylborates; nitrites; nitrates; carbonates; bicarbonates; alkanoates; O,O-di $C_{1-12}$ alkyldithiophosphates; or mixtures thereof.

In one embodiment, the quaternizing agent may be derived from dialkyl sulphates such as dimethyl sulfate, N-oxides, sultones such as propane and butane sultone; alkyl, or arylalkyl halides such as methyl and ethyl chloride, bromide or iodide or benzyl chloride, and a hydrocarbyl (or alkyl) substituted carbonates. If the alkyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment, the hydrocarbyl substituted carbonates contain two hydrocarbyl groups that may be the same or different. Examples of suitable hydrocarbyl substituted carbonates include dimethyl or diethyl carbonate.

In another embodiment, the quaternizing agent can be a hydrocarbyl epoxides, as represented by the following formula, in combination with an acid:

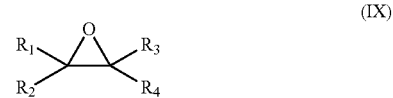

(IX)

wherein $R_1$, $R_2$, $R_3$ and Rs can be independently H or a $C_{1-50}$ hydrocarbyl group.

Examples of hydrocarbyl epoxides can include: styrene oxide, ethylene oxide, propylene oxide, butylene oxide, stilbene oxide and $C_{2-50}$ epoxide.

Fluidizer

The composition of the present invention can additionally contain a fluidizer.

In one embodiment, the fluidizer can be a polyetheramines, which can be represented by the formula $R[OCH_2CH(R^1)]_nA$, where R is a hydrocarbyl group, $R^1$ is selected from the group consisting of hydrogen, hydrocarbyl groups of 1 to 16 carbon atoms, and mixtures thereof, n is a number from 2 to about 50, and A is selected from the group consisting of —$OCH_2CH_2CH_2NR^2R^2$ and —$NR^3R^3$, where each $R^2$ is independently hydrogen or hydrocarbyl, and each $R^3$ is independently hydrogen, hydrocarbyl or —$[R^4N(R^5)]_pR^6$, where $R^4$ is $C_2$-$C_{10}$ alkylene, $R^5$ and $R^6$ are independently hydrogen or hydrocarbyl, and p is a number from 1-7. These polyetheramines can be prepared by initially condensing an alcohol or alkylphenol with an alkylene oxide, mixture of alkylene oxides or with several alkylene oxides in sequential fashion in a 1:2-50 mole ratio of hydric compound to alkylene oxide to form a polyether intermediate. U.S. Pat. No. 5,094,667 provides reaction conditions for preparing a polyether intermediate, the disclosure of which is incorporated herein by reference. In one embodiment, the alcohols can be linear or branched from 1 to 30 carbon atoms, in another embodiment 6 to 20 carbon atoms, in yet another embodiment from 10 to 16 carbon atoms. The alkyl group of the alkylphenols can be 1 to 30 carbon atoms, in another embodiment 10 to 20 carbon atoms. Examples of the alkylene oxides include ethylene oxide, propylene oxide or butylene oxide. The number of alkylene oxide units in the polyether intermediate can be 10-35 or 18-27. The polyether intermediate can be converted to a polyetheramine by amination with ammonia, an amine or a polyamine to form a polyetheramine of the type where A is —NR$^3$R$^3$. Published Patent Application EP310875 provides reaction conditions for the amination reaction, the disclosure of which is incorporated herein by reference. Alternately, the polyether intermediate can also be converted to a polyetheramine of the type where A is —OCH$_2$CH$_2$CH$_2$NR$^2$R$^2$ by reaction with acrylonitrile followed by hydrogenation. U.S. Pat. No. 5,094,667 provides reaction conditions for the cyanoethylation and subsequent hydrogenation, the disclosure of which is incorporated herein by reference. Polyetheramines where A is —OCH$_2$CH$_2$CH$_2$NH$_2$ are typically preferred. Commercial examples of polyetheramines are the Techron® range from Chevron and the Jeffamine® range from Huntsman.

In another embodiment, the fluidizer can be a polyether, which can be represented by the formula R$^7$O[CH$_2$CH(R$^8$)O]$_q$H, where R$^7$ is a hydrocarbyl group, R$^8$ is selected from the group consisting of hydrogen, hydrocarbyl groups of 1 to 16 carbon atoms, and mixtures thereof, and q is a number from 2 to about 50. Reaction conditions for preparation as well as various embodiments of the polyethers are presented above in the polyetheramine description for the polyether intermediate. A commercial example of a polyether is the Lyondell ND® series. Other suitable polyethers are also available from Dow Chemicals, Huntsman, and ICI.

In yet another embodiment, the fluidizer can be a hydrocarbyl-terminated poly-(oxyalklene) aminocarbamate as described U.S. Pat. No. 5,503,644.

In yet another embodiment, the fluidizer can be an alkoxylate, wherein the alkoxylate can comprise: (i) a polyether containing two or more ester terminal groups; (ii) a polyether containing one or more ester groups and one or more terminal ether groups; or (iii) a polyether containing one or more ester groups and one or more terminal amino groups wherein a terminal group is defined as a group located within five connecting carbon or oxygen atoms from the end of the polymer. Connecting is defined as the sum of the connecting carbon and oxygen atoms in the polymer or end group.

An alkoxylate can be represented by the formula:

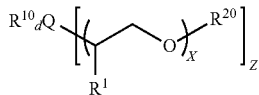

wherein, R$^{10}$ is H, TC(O)—, or a C$_{1-36}$ hydrocarbyl group, wherein T is a C$_{1-36}$ fatty acid hydrocarbyl mixture in tallow fatty acid or a fatty acid free of rosin acid; R$^{20}$ is H, A, WC(O)—, or mixtures thereof, wherein A is selected from the group consisting of —OCH$_2$CH$_2$CH$_2$NR$^2$R$^2$ and —NR$^3$R$^3$ where each R$^2$ is independently hydrogen or hydrocarbyl, and each R$^3$ is independently hydrogen, hydrocarbyl or —[R$^4$N(R$^5$)]$_p$R$^6$ where R$^4$ is C$_2$-C$_{10}$ alkylene, R$^5$ and R$^6$ are independently hydrogen or hydrocarbyl, and p is a number from 1-7, W is a C$_{1-36}$ hydrocarbyl group; R$^1$ is selected from the group consisting of hydrogen, hydrocarbyl groups of 1 to 16 carbon atoms; X is an integer from 1 to 36; Z is an integer 1 to 3; Q can be O or N; provided that if Q is N then d can be an integer from 0 to 2 and Z is the integer 3-d; if Q is O then d can be an integer 0 to 1 and Z is the integer 2-d and if Q is O and R$^1$ is C$_{1-36}$ hydrocarbyl group then R$^2$ is WC(O)—.

Examples of the alkoxylate can include: C$_{12-15}$ alcohol initiated polypropyleneoxide (22-24) ether amine, Bayer ACTACLEAR ND21-A™ (C$_{12-15}$ alcohol initiated polypropyleneoxide (22-24) ether-ol), tall oil fatty acid initiated polypropyleneoxide (22-24) ester-ol, butanol initiated polypropyleneoxide (23-25) ether-tallow fatty acid ester, glycerol dioleate initiated polypropyleneoxide (23-25) ether-ol, propylene glycol initiated polypropyleneoxide (33-34) ether tallow fatty acid ester, tallow fatty acid initiated polypropyleneoxide (22-24) ester-ol and C$_{12-15}$ alcohol initiated polypropyleneoxide (22-24) ether tallow fatty acid ester.

These alkoxylates can be made from the reaction of a fatty acid such as tall oil fatty acids (TOFA), that is, the mixture of fatty acids predominately oleic and linoleic and contains residual rosin acids or tallow acid that is, the mixture of fatty acids predominately stearic, palmitic and oleic with an alcohol terminated polyether such as polypropylene glycol in the presence of an acidic catalyst, usually methane sulfonic acid. These alkoxylates can also be made from the reaction of glycerol dioleate and propylene oxide in the presence of catalyst.

Oil of Lubricating Viscosity

The composition of the present invention can contain an oil of lubricating viscosity. The oil of lubricating viscosity includes natural or synthetic oils of lubricating viscosity, oil derived from hydrocracking, hydrogenation, hydrofinishing, unrefined, refined and re-refined oils, or mixtures thereof. In one embodiment, the oil of lubricating viscosity is a carrier fluid for the dispersant and/or other performance additives.

Natural oils include animal oils, vegetable oils, mineral oils or mixtures thereof. Synthetic oils include a hydrocarbon oil, a silicon-based oil, a liquid ester of phosphorus-containing acid. Synthetic oils may be produced by Fischer-Tropsch reactions and typically may be hydroisomerised Fischer-Tropsch hydrocarbons or waxes.

Oils of lubricating viscosity may also be defined as specified in the American Petroleum Institute (API) Base Oil Interchangeability Guidelines. In one embodiment the oil of lubricating viscosity comprises an API Group I, II, III, IV, V or mixtures thereof, and in another embodiment API Group I, II, III or mixtures thereof.

Miscellaneous

The composition optionally comprises one or more additional performance additives. The performance additives can include: metal deactivators, detergents, dispersants, viscosity modifiers, friction modifiers, dispersant viscosity modifiers, extreme pressure agents, antiwear agents, antioxidants, corrosion inhibitors, foam inhibitors, demulsifiers, pour point depressants, seal swelling agents, wax control polymers, scale inhibitors, gas-hydrate inhibitors, and mixtures thereof.

The total combined amount of the additional performance additive compounds present on an oil free basis ranges from 0 wt % to 25 wt % or 0.01 wt % to 20 wt % of the composition. Although, one or more of the other performance additives may be present, it is common for the other performance additives to be present in different amounts relative to each other.

In one embodiment, the composition can be in a concentrate forming amount. If the present invention may be in the form of a concentrate (which may be combined with additional oil to form, in whole or in part, a finished lubricant and/or liquid fuel), the ratio of the additive of the invention and/or other additional performance additives in an oil of lubricating viscosity and/or liquid fuel, to diluent oil is in the range of 80:20 to 10:90 by weight.

Antioxidants include molybdenum dithiocarbamates, sulphurised olefins, hindered phenols, diphenylamines; detergents include neutral or overbased, Newtonian or non-Newtonian, basic salts of alkali, alkaline earth and transition metals with one or more of phenates, sulfurized phenates, sulfonates, carboxylic acids, phosphorus acids, mono- and/or di-thiophosphoric acids, saligenins, an alkylsalicylates, salixarates.

Dispersants include N-substituted long chain alkenyl succinimide as well as posted treated version thereof, post-treated dispersants include those by reaction with urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds.

Antiwear agents include: metal thiophosphates, especially zinc dialkyldithiophosphates; phosphoric acid esters or salt thereof; phosphites; and phosphorus-containing carboxylic esters, ethers, and amides.

Anti-scuffing agents include: organic sulfides and polysulfides, such as, benzyldisulfide, bis-(chlorobenzyl) disulfide, dibutyl tetrasulfide, di-tertiary butyl polysulfide, di-tert-butylsulfide, sulfurized Diels-Alder adducts or alkyl sulfenyl N'N-dialkyl dithiocarbamates.

Extreme Pressure (EP) agents include: chlorinated wax; organic sulfides and polysulfides, such as, benzyldisulfide, bis-(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons; and metal thiocarbamates, such as, zinc dioctyldithiocarbamate.

Friction modifiers include: fatty amines; esters, such as, borated glycerol esters; partial esters of glycerol, such as, glycerol monooleate; fatty phosphites; fatty acid amides; fatty epoxides; borated fatty epoxides; alkoxylated fatty amines; borated alkoxylated fatty amines; metal salts of fatty acids; fatty imidazolines; condensation products of carboxylic acids and polyalkylenepolyamines; and amine salts of alkylphosphoric acids.

Viscosity modifiers include: hydrogenated copolymers of styrenebutadiene, ethylene-propylene polymers, polyisobutenes, hydrogenated styreneisoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers.

Dispersant viscosity modifiers (often referred to as DVM) include: functionalized polyolefins, for example, ethylene-propylene copolymers that have been functionalized with the reaction product of maleic anhydride and an amine; a polymethacrylate functionalized with an amine; and styrene-maleic anhydride copolymers reacted with an amine.

Corrosion inhibitors include: octylamine octanoate; condensation products of dodecenyl succinic acid or anhydride and a fatty acid, such as, oleic acid with a polyamine.

Metal deactivators include: derivatives of dimercaptothiodiazole, 1,2,4-triazoles, benzimidazoles, 2-alkyldithiobenzimidazoles or 2-alkyldithiobenzothiazoles.

Foam inhibitors include copolymers of ethyl acrylate and 2-ethylhexylacrylate and optionally vinyl acetate.

Demulsifiers include polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Seal swell agents include Exxon Necton-37™ (FN 1380) and Exxon Mineral Seal Oil.

INDUSTRIAL APPLICATION

In one embodiment, the present invention is useful as a liquid fuel for an internal combustion engine. The internal combustion engine includes spark ignition and compression ignition engines; 2-stroke or 4-stroke cycles; liquid fuel supplied via direct injection, indirect injection, port injection and carburetor; common rail and unit injector systems; light (e.g. passenger car) and heavy duty (e.g. commercial truck) engines; and engines fuelled with hydrocarbon and non-hydrocarbon fuels and mixtures thereof. The engines may be part of integrated emissions systems incorporating such elements as; EGR systems; aftertreatment including three-way catalyst, oxidation catalyst, NOx absorbers and catalysts, catalyzed and non-catalyzed particulate traps optionally employing fuel-borne catalyst; variable valve timing; and injection timing and rate shaping.

In another embodiment, the present invention is useful in coatings, inks, millbases, plastics and paints, especially high solids paints; inks, especially offset, gravure and screen inks, radiation curable inks; non-aqueous ceramic processes, especially tape-coating, doctor-blade, extrusion and injection moulding type processes; composites, cosmetics, adhesives and plastics materials. Additionally, the composition of the present invention is an effective dispersant for uniformly distributing a particulate solid in an organic medium. Examples of suitable particulate solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials; and biocides, agrochemicals and pharmaceuticals which are applied as dispersions in organic media.

In one embodiment, the invention provides a composition comprising (i) a particulate solid; (ii) an organic medium; and (iii) a quaternary ammonium salt which comprises the reaction product of:

a. polyalkene-substituted amine having at least one a tertiary amino group; and b. quaternizing agent suitable for converting the tertiary amino group to a quaternary nitrogen.

In one embodiment, the organic medium is an organic liquid or a plastics material.

In one embodiment, the composition as claimed in claim 1 wherein the organic liquid comprises at least 0.1% by weight of a polar organic liquid based on the total organic liquid.

In one embodiment, the particulate solid is a pigment.

In one embodiment, the invention provides a paint or ink composition comprising a particulate solid, an organic liquid, a binder and a quaternary ammonium salt which comprises the reaction product of:

a. polyalkene-substituted amine having at least one a tertiary amino group; and b. quaternizing agent suitable for converting the tertiary amino group to a quaternary nitrogen.

The binder is a polymeric material capable of binding the composition on volatilization of the organic liquid. Binders are polymeric materials including natural and synthetic materials. In one embodiment, binders include poly(meth) acrylates, polystyrenics, polyesters, polyurethanes, alkyds, polysaccharides such as cellulose, and natural proteins such as casein. In one embodiment, the binder can be present in the composition at more than 100% based on the amount of particulate solid, more than 200%, more than 300% or more than 400%.

In one embodiment, the invention provides a mill-base comprising a particulate solid, an organic liquid and a quaternary ammonium salt which comprises the reaction product of:
  a. polyalkene-substituted amine having at least one a tertiary amino group; and
  b. quaternizing agent suitable for converting the tertiary amino group to a quaternary nitrogen.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon blacks.

Inorganic solids include: extenders and fillers, such as, talc, kaolin, silica, barytes and chalk; particulate ceramic materials, such as, alumina, silica, zirconia, titania, silicon nitride, boron nitride, silicon carbide, boron carbide, mixed silicon-aluminium nitrides and metal titanates; particulate magnetic materials, such as, the magnetic oxides of transition metals, especially iron and chromium, e.g. gamma-$Fe_2O_3$, $Fe_3O_4$, cobalt-doped iron oxides, calcium oxide, ferrites, especially barium ferrites; and metal particles, especially metallic iron, nickel, cobalt, copper and alloys thereof.

In one embodiment, the organic medium, which can be present with the composition of the reaction product of the invention and particulate solid, is a plastics material. In another embodiment the organic medium can be an organic liquid. The organic liquid may be a non-polar or a polar organic liquid. In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, linseed oil, terpenes and glycerides). In one embodiment, thermoplastic resins include: polyolefins, polyesters, polyamides, polycarbonates, polyurethanes, polystyrenics, poly(meth)acrylates, celluloses and cellulose derivatives. The compositions may be prepared in a number of ways but melt mixing and dry solid blending are typical methods. If desired, the compositions may contain other ingredients, for example, resins (where these do not already constitute the organic medium), binders, fluidizing agents anti-sedimentation agents, plasticizers, surfactants, anti-foamers, rheology modifiers, leveling agents, gloss modifiers and preservatives.

A dispersion may be prepared by any of the conventional methods known for preparing dispersions. Thus, the particulate solid, the organic medium, and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. In one embodiment, such dispersion compositions comprise:
  (a) from 0.5 to 70 parts of a particulate solid;
  (b) from 0.5 to 30 parts of a compound of the quaternary ammonium salt described above; and
  (c) from 20 to 99 parts of an organic liquid; wherein all parts are by weight and the amounts (a)+(b)+(c)=100. and such dispersions are useful as (liquid) inks, paints, and mill-bases.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

Example A

Preparation of Polyisobutene-dimethylamine (PIB DMA) Via Chlorine

An apparatus suitable to handle chlorine and hydrogen chloride gas (glass reactor, glass stirrer, PTFE joints, glass thermowell for thermocouple) is connected to sodium hydroxide scrubbers. The glass vessel is charged with 1000 g (~1 mole, 1 equiv.) of low vinylidene 1000 Mn polyisobutylene (PIB) and is heated to 110-120° C. and 1 mole (70 g, 1 equiv) chlorine bubbled into the reactor over 7 hours. The reaction is sparged with nitrogen at 110-120° C. overnight to remove HCl.

The resultant PIB chloride is transferred to an autoclave and the autoclave sealed. For every mole (~1030 g) PIB chloride 1 mole of gaseous dimethylamine (45 g) is added and the reaction is heated to 160-170° C. for 8 hours, or until no further reduction in pressure is seen. The reaction is cooled to room temperature and the pressure is released. Enough Solvesso™ 150 solvent is added to make a 70% w/w actives solution and the reaction is stirred until homogenous. The resultant PIB-DMA solution is transferred to a separating funnel and washed twice with 2M sodium hydroxide solution, to remove HCl and NaCl. After separation, the product is dried over MgSO4 and is filtered through a Celite™ pad.

Example B

Preparation of Polyisobutene-dimethylamine (PIB DMA) Via Hydroformylation

High vinylidene polyisobutylene (PIB) (500 g, Mn 950, 0.53 moles), 300 g dodecane and 2.8 g cobalt octacarbonyl is heated in a 2.5 litre autoclave at 280 bar 1:1 CO:H2 for 5 hours at 185° C., while stirring. The mixture is cooled to room temperature and the catalyst is removed by washing with 400 ml 10% aqueous acetic acid. The product is neutralized by washing, and the dodecane is stripped off to yield the PIB aldehyde and possibly also PIB alcohol.

A reactor equipped with stirrer, condenser and Dean and Stark trap is charged with 1 mole (~980 g) of the above hydroformylated PIB plus 0.5 moles of 40% aqueous dimethylamine solution (112.5 g) and 500 ml cyclohexane. The reaction is heated to reflux until no more water is removed, and the cyclohexane is removed by distillation under vacuum. 1 kg of the azomethine product from above is reacted with 100 g Raney nickel and 25000 kPa hydrogen in an autoclave at 200° C. for 4 hours, followed by stripping under vacuum, yielding the final PIB-DMA product.

Example 1

Dimethylsulfate Quaternary Ammonium Salt Made from the Reaction Product of Example A The reaction product of Example A, (Mn 1045, 70% active, 41 g, 27.5 mmol) is stirred at room temperature in a glass vessel and then dimethyl sulphate (3.3 g, 26.2 mmol) is added dropwise over one minute to provide the quaternary ammonium salt. The whole mixture is stirred at room temperature for 1 hour under a nitrogen blanket and is sampled and titrated against bromocresol green indicator.

Example 2

Benzyl-Chloride Quaternary Ammonium Salt Made from the Reaction Product of Example A The reaction product of Example A, (Mn 1045, 70% active, 41 g, 27.5 mmol) is stirred at room temperature in a glass vessel and then benzyl chloride (3.32 g, 26.2 mmol) is added drop wise over one minute to provide the quaternary ammonium salt. The mixture is stirred at room temperature for 1 hour under a nitrogen blanket and is sampled and titrated against bromocresol green indicator.

Example 3

Dimethylsulfate Quaternary Ammonium Salt Made from the Reaction Product of Example B The reaction product of Example B (Mn 995, 23.7 g, 23.8 mmol) is stirred in a glass vessel with 10 g Solvesso™ 150 solvent until homogenous and dimethyl sulphate (2.85 g, 22.6 mmol) is added to provide the quaternary ammonium salt and the reaction is heated at 90° C. for 3 hours under a nitrogen blanket. At the end of the 3 hours, the mixture is sampled and titrated against bromocresol green indicator.

Example 4

Benzyl-Chloride Quaternary Ammonium Salt Made from the Reaction Product of Example B The reaction product of Example B (Mn 995, 23.7 g, 23.8 mmol) is stirred in a glass vessel with 10 g Solvesso™ 150 solvent until homogenous and benzyl chloride (2.86 g, 22.6 mmol) is added to provide the quaternary ammonium salt and the reaction is heated at 90° C. for 3 hours under a nitrogen blanket. At the end of the 3 hours, the mixture is sampled and titrated against bromocresol green indicator.

Example 5

Styrene Oxide Quaternary Ammonium Salt Made from the Reaction Product of Example A The reaction product of Example A (Mn 1045, 522.5 g, 0.5 moles) is mixed in a reaction vessel with styrene oxide (60 g, 0.5 moles) and is heated up to 80° C. Once the mixture reaches 80° C., acetic acid (30 g, 0.5 moles) is added dropwise over 2 hours to provide the quaternary ammonium salt. After the addition of the acetic acid, the temperature of the mixture is maintained for 2 to 3 hours. The reaction is monitored by FTIR. The mixture is cool to 50° C. and decanted into a storage vessel.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What we claim:

1. A composition comprising a quaternary ammonium salt which comprises the reaction product of:
   a. polyalkene-substituted amine having at least one tertiary amino group; and
   b. quaternizing agent suitable for converting the tertiary amino group to a quaternary nitrogen,
wherein the quaternizing agent is a hydrocarbyl epoxide, as represented by formula (IX), in combination with an acid

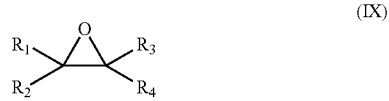

(IX)

wherein $R_1$, $R_2$, $R_3$, and $R_4$ can be independently H or a $C_{1-50}$ hydrocarbyl group; and
wherein the polyalkene-substituted amine has a number average molecular weight of about 500 to about 3000 and is derived from a polyisobutylene.

2. The composition of claim 1, further comprising a fuel which is liquid at room temperature.

3. The composition of claim 1, further comprising a fluidizer.

4. The composition of claim 1, further comprising an oil of lubricating viscosity.

5. The composition of claim 4, further comprising component selected from the group consisting of metal deactivators, detergents other than those of claim 1, dispersants, viscosity modifiers, friction modifiers, dispersant viscosity modifiers, extreme pressure agents, antiwear agents, antioxidants, corrosion inhibitors, foam inhibitors, demulsifiers, pour point depressants, seal swelling agents, wax control polymers, scale inhibitors, gas-hydrate inhibitors and mixtures thereof.

6. The composition of claim 5, wherein the component is an overbased metal containing detergent, zinc dialkyldithiophosphates or mixtures thereof.

7. A method of fueling an internal combustion engine comprising:
   A. supplying to said engine:
      i. a fuel which is liquid at room temperature; and
      ii. the composition of claim 1.

8. A method of lubricating an internal combustion engine comprising:
   A. supplying to the crankcase of said engine:
      i. an oil of lubricating viscosity; and
      ii. the composition of claim 1.

9. A composition comprising: (i) a particulate solid; (ii) an organic medium; and (iii) the composition of claim 1.

10. The composition of claim 9, wherein the organic medium is an organic liquid or a plastics material.

11. The composition of claim 10, wherein the organic liquid comprises at least 0.1% by weight of a polar organic liquid based on the total organic liquid.

12. The composition of claim 9, wherein the particulate solid is a pigment.

13. A paint or ink composition comprising a particulate solid, an organic liquid, a binder and the composition of claim 1.

14. A mill-base comprising a particulate solid, an organic liquid and the composition of claim 1.

* * * * *